Aug. 19, 1969      W. A. PFAFF      3,462,218

FLOW CAMERA

Filed May 4, 1967      3 Sheets-Sheet 1

INVENTOR.
WILLIAM A. PFAFF
BY *Albert F. Konman*
ATTORNEY

Aug. 19, 1969  W. A. PFAFF  3,462,218
FLOW CAMERA

Filed May 4, 1967  3 Sheets-Sheet 3

INVENTOR.
WILLIAM A. PFAFF
BY Albert F. Kronman
ATTORNEY 3,462,218
FLOW CAMERA
William A. Pfaff, 12 Marys Lane,
Centerport, N.Y. 11721
Filed May 4, 1967, Ser. No. 636,197
Int. Cl. G03b 27/48
U.S. Cl. 355—50        6 Claims

ABSTRACT OF THE DISCLOSURE

A microfilm flow camera for photographing a relatively small number of documents upon a film strip. A resilient roller drive moves the document across a flat transparent plate disposed in the object plane and in front of a lens for focusing the light from the document onto an image plane. The film during exposure is driven from a cassette into an elongated storage chamber from which, after the exposure, the film is rewound into the cassette.

Summary of the invention

Microfilm camers are old in the art and have been used for some time to record documents on film. These cameras have generally been designed for handling a large number of documents and for this reason a container for unexposed film has been used with a similar container for the exposed film. After the roll of film has been exposed, it is removed from the camera in the container and processed.

The present invention is designed to be used when only a relatively few documents are to be recorded. A single storage container is used and, after exposure, the exposed film is stored in random looped array in an elongated box. After the exposure operation, the film is rewound into the container, removed from the camera, and developed. The present invention uses only one document feed roller, made of resilient material, a plurality of illuminating lamps, a single motor which runs all the time the camera is in use, and a single power roller for moving the unexposed film through the image plane.

One feature of the invention includes a manual rewind means which is first moved to engage a roller in the film container and then turned to rewind all the exposed film back into the container. During the rewind operation, a flange on the rewind shaft makes contact with an idler roller which normally holds the film in contact with the power roller and moves it away from the film.

Description of the preferred embodiment

The camera is housed in a box 10 having two side covers 11 and 12. At one end of the box a slot 13 is provided in the top for inserting documents to be copied.

Figure 5:
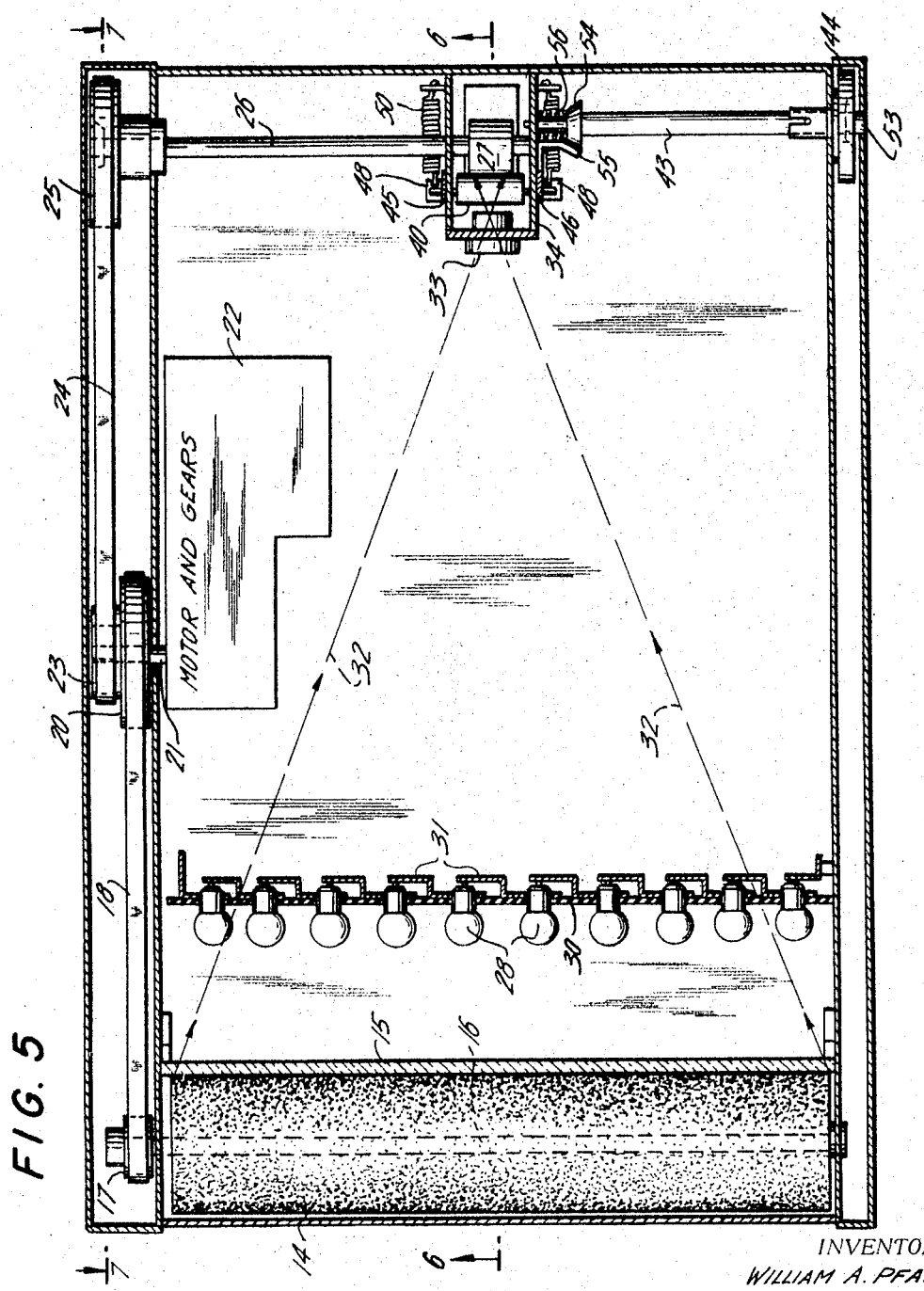
FIGURE 5 is a cross sectional view of the entire machine, taken along line 5—5 of FIGURE 6.

The inside arrangement of components is best shown in FIGURE 5. A document drive roller 14 is rotatably mounted just under the slot 13 and rests against a flat transparent plate 15 which may be made of glass. The document roller 14 is preferably made of spongy polyethylene since this material slides easily over a glass surface but grips the fibrous paper documents securely to pull them through an object plane. The document roller 14 includes a shaft 16 which is secured to a pulley 17, coupled to a belt 18. The belt 18 passes over a driver pulley 20, secured to shaft 21 which is turned by a motor and gear box 22. Shaft 21 is also secured to a smaller pulley 23 which drives a belt 24 and a large pulley 25. Pulley 25 is connected to a shaft 26 which is secured to a film feed roller 27 to move the document and film synchronously. A discharge slot 13a is provided at the bottom of the box 10.

Illumination for the documents is supplied by a plurality of small lamps 28 secured to an insulator panel 30 and connected in series with each other by means of metal electrodes 31. When the lamps are connected in series there is no need for a transformer and when one lamp burns out, all the lamps will go out, this fact being more readily discernible than if a single lamp connected in parallel were to be extinguished. The lamps 28 generate light which passes through the transparent plate 15 and shines on the document which is held between the plates 15 and the sponge plastic roller 16. Light from the document proceeds in a direction indicated by arrows 32 to a lens 33 set in a film drive light-tight chamber 34.

Figure 1:
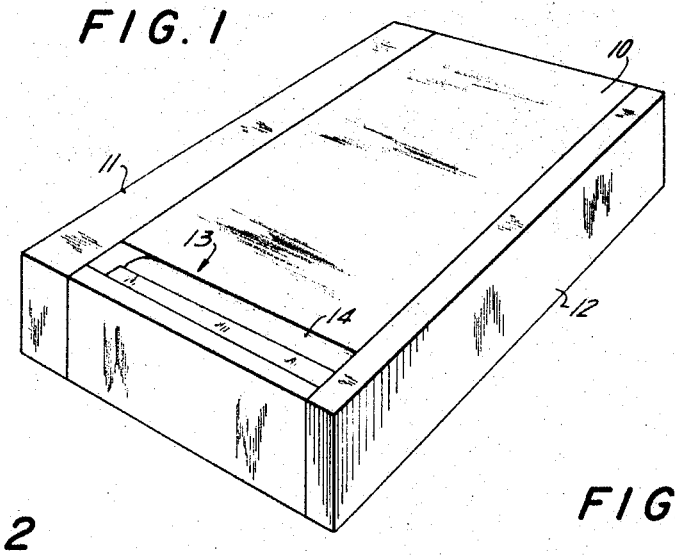
FIGURE 1 is a perspective view of the camera showing the slot through which the documents are entered.
Figure 2:
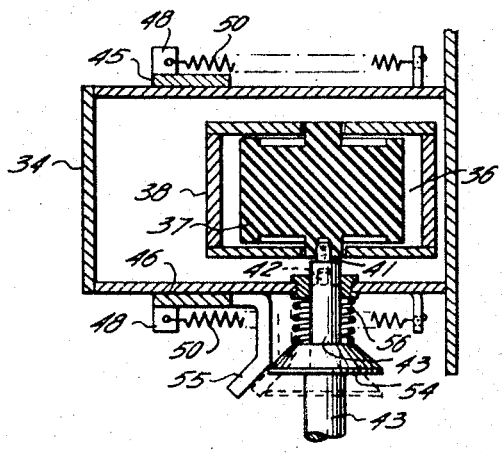
FIGURE 2 is a cross sectional view, to an enlarged scale, of the film container, showing a portion of the rewind mechanism and the roller disengaging means.

The details of the drive chamber 34 are best described by reference to FIGURES 2, 3 and 4. The unexposed film 36 is wound on a reel 37 enclosed in a film container or cassette 38 with a short length protruding. The cassette is loaded with unexposed film and then inserted into the drive chamber 34 by means of a door in the bottom of the housing (not shown). The end of the film 36 is thus automatically inserted between the film feed roller 27 and an idler roller 40. The film reel 37 is formed with a slot 41 which may be engaged by a key 42 at the end of a shaft 43 which is connected to a manually operated wheel 44 (FIGURE 5). Further details of this mechanism will be described when the rewind operation is disclosed.

Figure 4:
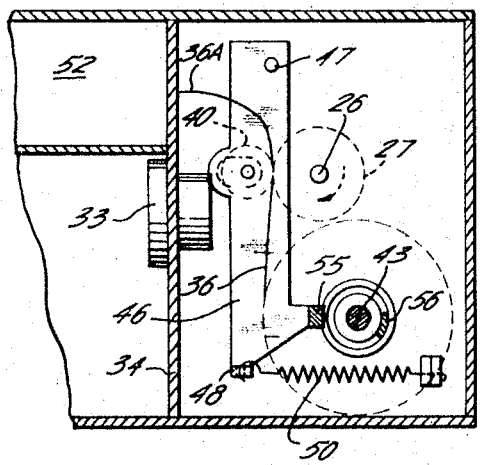
FIGURE 4 is a side view of the film container and disengaging means with some parts in section.
Figure 6:
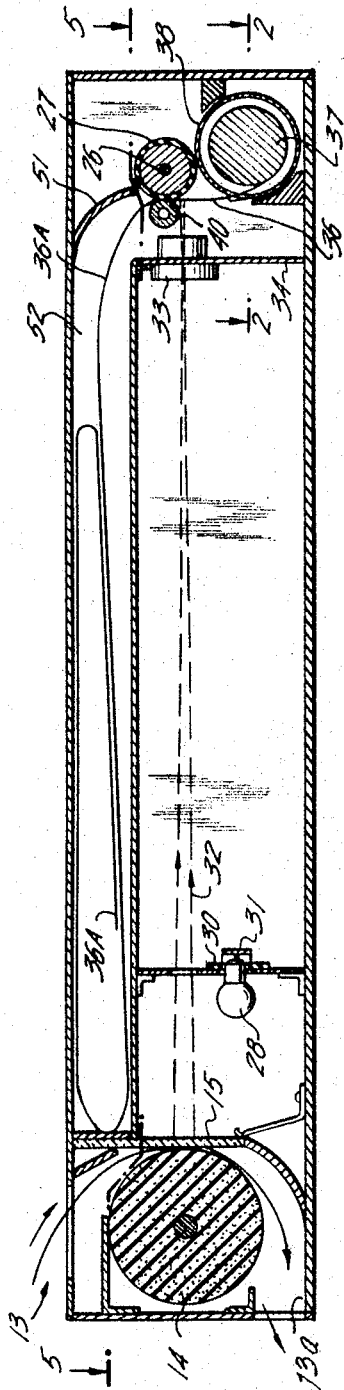
FIGURE 6 is across sectional view of the machine taken along line 6—6 of FIGURE 5.
Figure 7:
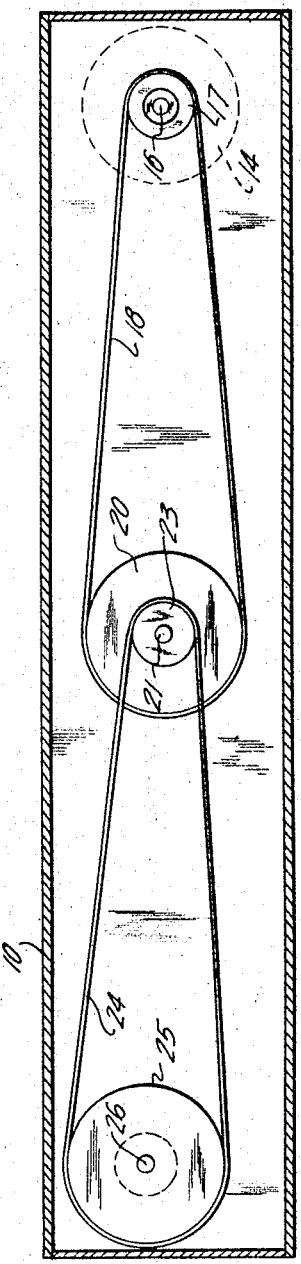
FIGURE 7 is a side view of the machine taken on line 7—7 of FIGURE 6 with one cover removed, showing the system of belts and pulleys.

Idler roller 40 is journaled in two levers 45 and 46, each lever being pivoted on a pin 47 (FIGURE 4). At the lower extremity of each lever a turned-over portion 48 is provided for connection to a helical spring 50 or other similar resilient means for exerting pressure on the idler roller 40 to hold the film 36 firmly against the film roller 27. The film roller 27 turns in a direction indicated by the arrow in FIGURE 4 and draws the unexposed film 36 across an image plane directly behind the lens 33. After exposure, the film 36A moves upwardly and is directed by a guide 51 into a light-tight exposed film chamber 52, which is in communication with the film drive chamber. There the film is collected and stored in random looped array, as indicated in FIGURE 6.

The operation of this camera is as follows: the motor 22 is started and a document is entered through slot 13 so that it is engaged by the foam plastic roller 14 and drawn along the surface of plate 15 with the surface to be copied against the plate. The flat surface of the plate 15 thus becomes the object plane of the camera. The document is driven out of the camera by the roller 14 through the discharge slot 13a. Lamps 28 illuminate the document and the reflected light is collected and focused by lens 33 onto the moving film 36 as it is driven through the image plane by roller 27. The exposed film 36A is driven into the storage compartment 52. After all but a short length of the film is used up, the operator removes cover 12 from box 10, depresses the end 53 of shaft 43 and turns wheel 44 in a counterclockwise direction, as viewed from the side. When end 53 is depressed, a beveled wheel 54 engages an outwardly turned cam portion 55 which is part of lever 46 and moves both levers 46 and 45 away from the film roller 27, thereby disengaging the idler roller 40 from the film and permitting it to move freely over the drive roller 27.

Figure 3:
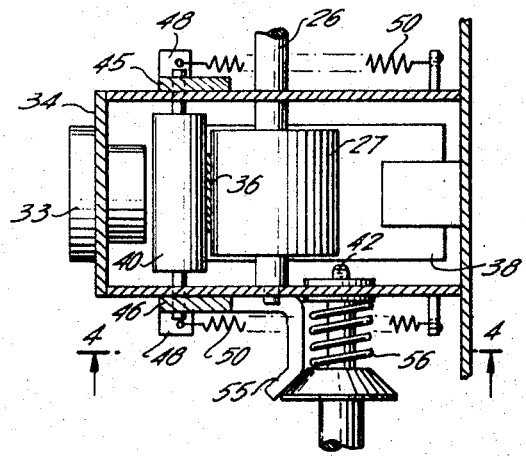
FIGURE 3 is another cross sectional view of the film container and showing the lens and idler roller.

The beveled wheel 54 is normally held in the position shown in FIGURES 3 and 5 by a spring 56, this position being shown in FIGURE 3, where key portion 42 is pulled clear of the slot 41, in the film reel 37. When shaft end 53 is depressed, the key portion 42 makes engagement with slot 41 and then, when the shaft 43 is turned, the film reel 37 rewinds the film from the storage compartment 52 back into the cassette 38. The cassette 38 may now be removed from the camera and the exposed film developed. A counter means and buzzer (not shown) may be secured to shaft 26 to indicate when the desired amount of film has been exposed. Such counters and signaling devices are old in the art and need not be described here.

It will be obvious from the above description that the present invention can be used to photograph a relatively small number of documents by the use of a simple, lightweight, and inexpensive camera. The camera has few moving parts and is threaded automatically and quickly when it is desired to record documents on a small film strip.

Having thus fully described the invention, what is claimed as new and desired to be secured by Letters Patent of the United States, is:

1. A flow camera for photographing a plurality of documents upon a strip of sensitized film comprising a housing having a document receiving slot and a document discharge slot at one end thereof, a transparent plate carried within the housing between the slots, a resilient roller journaled within the housing in frictional wiping contact with the plate, drive means for the roller whereby documents inserted into the receiving slot between the roller and the plate will be driven across the plate, through the housing and out of the discharge slot, a light source within the housing for illuminating the document as it is driven across the plate, a film drive chamber within the housing spaced from the plate, a lens within the drive chamber to receive light coming from the document and focus it upon an image plane within the drive chamber, a container for a supply of strip photographic film within the drive chamber, said container including a reel on which the film is wound, a film drive roller mounted adjacent the container and the image plane for drawing the film out of the container, an idler roller for holding the film against the film roller, means to couple the resilient roller drive means to the film drive roller for moving the film through the image plane when exposures are being made, an elongated film storage chamber in communication with the film drive chamber for receiving the exposed film in random looped array and means to rewind the exposed film in the storage chamber upon the reel.

2. A camera as claimed in claim 1 wherein said document roller is made of foam plastic.

3. A camera according to claim 1 in which the rewind means comprises a shaft, a slot carried by the film reel, a key on the shaft to engage the slot, a key disengaging means and cam means for releasing the bight of the film drive roller and idler roller during rewinding.

4. A camera as claimed in claim 1 wherein said idler roller is journaled at each end in a movable bearing and the bearings are yieldably urged in the direction of the film drive roller by springs.

5. A camera according to claim 1 in which the light source comprises a plurality of spaced series connected lamps.

6. A microfilm camera as claimed in claim 3 wherein said disengaging means includes a beveled disk secured to the rewind means, said disk arranged for making contact with a pair of levers which journal the idler roller.

References Cited

UNITED STATES PATENTS

| 1,748,489 | 2/1930 | McCarthy et al. | 355—64 |
| 1,900,878 | 3/1933 | Hopkins | 355—64 |
| 2,248,627 | 7/1941 | Holbrook | 355—64 |
| 2,478,641 | 8/1949 | Rose et al. | 355—64 |

NORTON ANSHER, Primary Examiner

RICHARD A. WINTERCORN, Assistant Examiner

U.S. Cl. X.R.

95—12; 355—64